United States Patent
Somasundaram et al.

(10) Patent No.: US 9,787,569 B2
(45) Date of Patent: Oct. 10, 2017

(54) RADIO ACCESS TECHNOLOGY CO-EXISTENCE USING ADAPTIVE ENERGY DETECTION

(71) Applicant: QUALCOMM Incorporated, San Diego, CA (US)

(72) Inventors: Kiran Kumar Somasundaram, San Diego, CA (US); Durga Prasad Malladi, San Diego, CA (US); Tao Luo, San Diego, CA (US); Aleksandar Damnjanovic, Del Mar, CA (US); Yongbin Wei, La Jolla, CA (US); Qingsi Wang, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 14/968,563

(22) Filed: Dec. 14, 2015

(65) Prior Publication Data

US 2016/0173361 A1    Jun. 16, 2016

Related U.S. Application Data

(60) Provisional application No. 62/092,129, filed on Dec. 15, 2014.

(51) Int. Cl.
*H04W 4/00* (2009.01)
*H04L 12/26* (2006.01)
(Continued)

(52) U.S. Cl.
CPC .......... *H04L 43/16* (2013.01); *H04B 17/318* (2015.01); *H04L 1/0036* (2013.01); *H04W 16/14* (2013.01);
(Continued)

(58) Field of Classification Search
CPC ...... H04L 43/16; H04L 1/0036; H04W 24/08; H04W 16/14; H04W 84/12; H04W 88/06; H04W 88/10; H04B 17/318
(Continued)

(56) References Cited

U.S. PATENT DOCUMENTS 8,554,333 B2    10/2013  Wu et al.
8,848,607 B2    9/2014   Wang et al.
(Continued)

FOREIGN PATENT DOCUMENTS

WO    WO-2011/123531 A1    10/2011
WO    WO 2011123531 A1 *  10/2011    ............ H04W 16/14
WO    WO-2013/112983 A2    8/2013

OTHER PUBLICATIONS

International Search Report and Written Opinion—PCT/US2015/065729—ISA/EPO—dated Mar. 22, 2016. 15 Total Pages.
(Continued)

*Primary Examiner* — Mang Yeung
(74) *Attorney, Agent, or Firm* — Arent Fox, LLP

(57) ABSTRACT

The disclosure provides for a method of interference detection using adaptive energy detection in unlicensed spectrum. The method can include a first modem operating according to a first radio access technology (RAT) receiving a message from a network entity operating according to the first RAT. The first modem sends a detected energy level value to a second modem that is using a second RAT, where the detected energy level value is based at least on the measured energy level of the received message. The second modem adjusts an energy detection threshold based on the detected energy level value received from the first modem. In an aspect, the first modem receives messages from a plurality of network entities operating according to the first RAT, where the detected energy level value is determined based
(Continued)

on measured energy levels of the plurality of received messages.

28 Claims, 10 Drawing Sheets

(51) Int. Cl.
    *H04W 24/08* (2009.01)
    *H04L 1/00* (2006.01)
    *H04W 16/14* (2009.01)
    *H04B 17/318* (2015.01)
    *H04W 88/06* (2009.01)
    *H04W 88/10* (2009.01)
    *H04W 84/12* (2009.01)

(52) U.S. Cl.
    CPC ............ *H04W 24/08* (2013.01); *H04W 84/12* (2013.01); *H04W 88/06* (2013.01); *H04W 88/10* (2013.01)

(58) Field of Classification Search
    USPC .......................................................... 370/328
    See application file for complete search history.

(56) References Cited

U.S. PATENT DOCUMENTS

| | | | |
|---|---|---|---|
| 2007/0004430 A1* | 1/2007 | Hyun | G01S 5/0236 455/456.1 |
| 2012/0213116 A1 | 8/2012 | Koo et al. | |
| 2013/0208587 A1 | 8/2013 | Bala et al. | |
| 2014/0274105 A1 | 9/2014 | Wang | |
| 2016/0174107 A1* | 6/2016 | Kanugovi | H04L 12/28 370/236 |

OTHER PUBLICATIONS

KDDI: "Considerations on LAA-LTE Designs for Fair Co-existence", 3GPP Draft; R1-144929 LAA Design, 3RD Generation Partnership Project (3GPP), Mobile Competence Centre ; 650, Route Des Lucioles; F-06921 Sophia-Antipolis Cedex; France vol. RAN WG1, no. San Francisco, USA; Nov. 17, 2014-Nov. 21, 2014, Nov. 17, 2014 (Nov. 17, 2014), XP050875982, pp. 3.

* cited by examiner

RADIO ACCESS TECHNOLOGY CO-EXISTENCE USING ADAPTIVE ENERGY DETECTION

CLAIM OF PRIORITY

The present application for patent claims priority to Provisional Application No. 62/092,129 entitled "RADIO ACCESS TECHNOLOGY CO-EXISTENCE USING ADAPTIVE ENERGY DETECTION" filed Dec. 15, 2014, which is assigned to the assignee hereof and hereby expressly incorporated by reference herein.

BACKGROUND

Aspects of the present disclosure generally relate to wireless communications. Specifically, the aspects relate to techniques of interference determination using adaptive energy detection.

Wireless communications networks are widely deployed to provide various communication services, such as voice, video, broadcast, packet data, etc. These wireless networks can be multiple-access networks, capable of supporting multiple users by sharing the available network resources. Examples of such multiple-access networks include: Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communications network can include a number of base stations, NodeBs, eNodeBs, etc., which can support communication for a number of user equipment (UE) devices. A UE can communicate with an eNodeB via the downlink and uplink. The downlink (or forward link) refers to the communication link from the eNodeB to the UE, and the uplink (or reverse link) refers to the communication link from the UE to the eNodeB.

To supplement conventional base stations, additional restricted power or restricted coverage base stations, referred to as small-coverage base stations or cells, can be deployed to provide more robust wireless coverage to mobile devices. For example, wireless relay stations and low-power base stations (e.g., which can be commonly referred to as Home eNodeBs or Home eNBs, collectively referred to as H(e)NBs, femto cells, pico cells, etc.) can be deployed for incremental capacity growth, richer user experience, in-building or other specific geographic coverage. Such low-power or small-coverage base stations (e.g., the power relative to macro network base stations or cells) can be connected to the Internet via broadband connection (e.g., digital subscriber line (DSL) router, cable or modem, etc.), which can provide the backhaul link to the mobile operator's network.

Thus, for example, the small-coverage base stations can be deployed in user homes to provide mobile network access to one or more devices via the broadband connection. As deployment of such base stations is unplanned, low-power base stations can interfere with one another where multiple stations are deployed within a close vicinity of one another.

Operation of wireless devices in certain portions of a shared or unlicensed spectrum may experience interference from another radio access technology (RAT) using the spectrum. For example, LTE (or some other wireless wide area network technology) and another access technology (e.g., one specified by IEEE 802.11 (Wi-Fi), 802.15.1 (Bluetooth), 802.15.4 (ZigBee), or some other wireless local area network technology) may operate in an unlicensed band. Interference from the second RAT on a signal of the first RAT within the shared communication channel may degrade the signal quality of first RAT signal. While solutions like filters may be used to reduce interference, such filters often rely on inaccurate channel estimates and may also reduce the signal strength of the desired signal, decreasing the signal-to-noise ratio.

In view of the foregoing, it may be understood that there may be significant challenges associated with the operation of wireless devices in a shared and unlicensed communications spectrum.

SUMMARY

Various aspects are now described with reference to the drawings. In the following description, for purposes of explanation, numerous specific details are set forth in order to provide a thorough understanding of one or more aspects. It may be evident, however, that such aspects may be practiced without these specific details. The following presents a simplified summery of one or more aspects in order to provide a basic understanding of such aspects.

The disclosure provides for a method of interference detection using adaptive energy detection in unlicensed spectrum. The method can include a first modem operating according to a first radio access technology (RAT) receiving a message from at least one network entity operating according to the first RAT. In an aspect, the first modem detects the received message at a measured energy level. The first modem can send a detected energy level value from the message to a second modem operating according to a second RAT different from the first RAT, where the detected energy level value is based at least on the measured energy level of the received message. The second modem can adjust an energy detection threshold based on the detected energy level value received from the first modem.

In another aspect, the disclosure provides for an apparatus for wireless communication. The apparatus includes a first modem configured to operate according to a first RAT, receive a message from at least one network entity operating according to the first RAT, wherein the received message is detected by the first modem at a measured energy level, and send the detected energy level value based on the measured energy level of the received message. The apparatus also includes a second modem configured to operated according to a second RAT different from the first RAT and adjust an energy detection threshold based on the detected energy level value received from the first modem.

In another aspect, the disclosure provides for an apparatus for wireless communication. The apparatus includes means for receiving a message via a first radio access technology (RAT) from at least one network entity operating according to the first RAT, wherein the received message is detected at a measured energy level. The apparatus also includes means for sending a detected energy level value based at least on the measured energy level of the received message via a second RAT different from the first RAT. The apparatus also includes means for adjusting, by the second modem, an energy detection threshold based on the detected energy level value.

In another aspect, the disclosure provides a computer-readable medium for wireless communications. The computer-readable medium includes code that, when executed on at least one processor, causes the at least one processor to receive, by a first modem operating according to a first radio access technology (RAT), a message from at least one network entity operating according to the first RAT, wherein the message comprises a detected energy level value. The computer-readable medium also includes code for the processor to send, from the first modem to a second modem operating according to a second RAT different from the first RAT, the detected energy level value from the message. The computer-readable medium also includes code for the processor to adjust, by the second modem, an energy detection threshold based on the detected energy level value received from the first modem.

Various aspects and features of the disclosure are described in further detail below with reference to various examples thereof as shown in the accompanying drawings. With the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

Figure 1A:
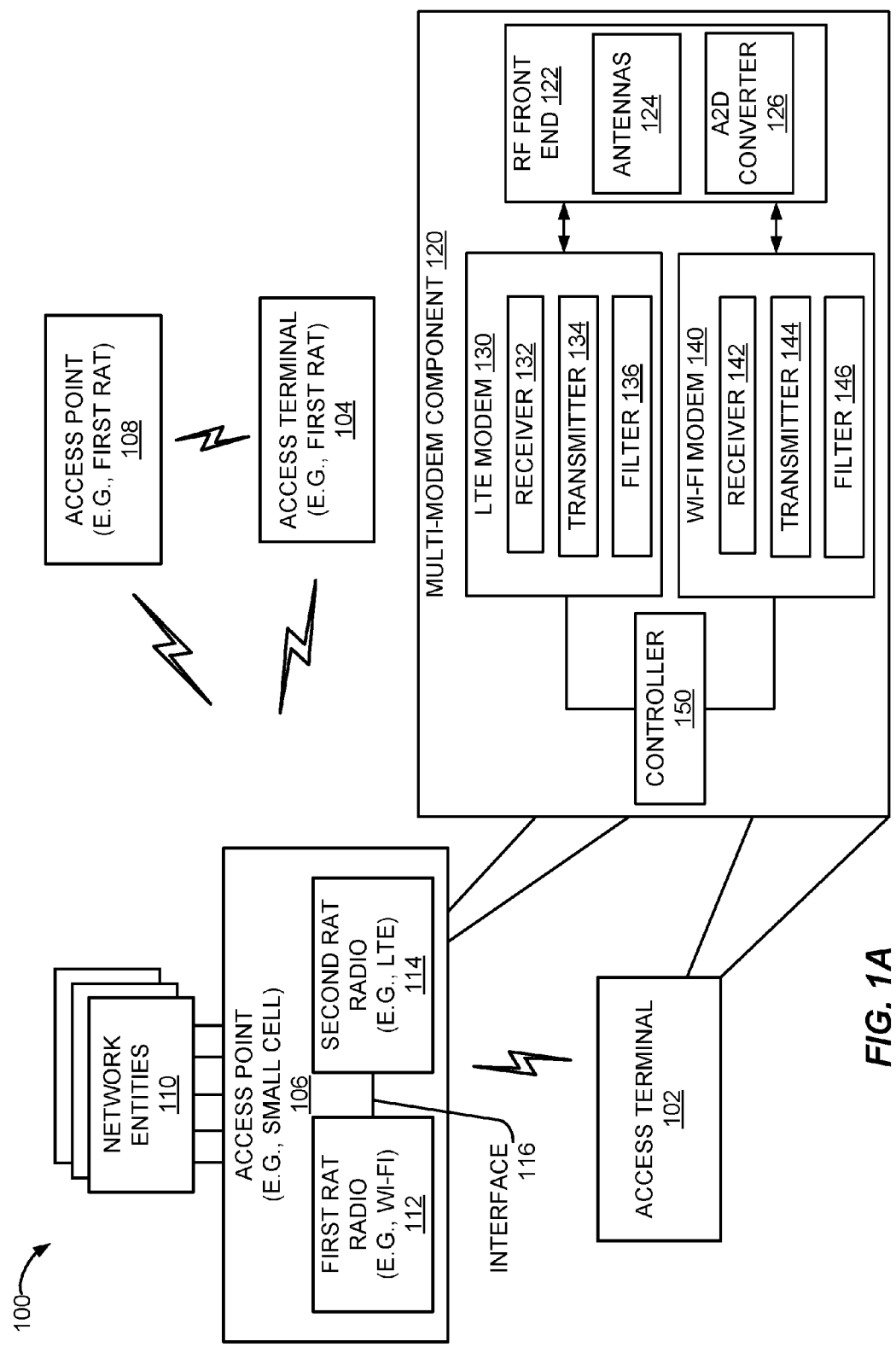
FIG. 1A is a block diagram illustrating an example of a telecommunications system in accordance with some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

A wireless device operating in shared, unlicensed spectrum can be configured to transmit signals in or receive signals from two or more radio access technology (RAT) types. For example, a wireless device can be configured to receive both an LTE signal (or a signal from some other wireless wide area network technology) and an IEEE 802.11 (Wi-Fi) signal (or a signal from some other wireless local area network technology). In an aspect, but not limited to this situation, the received LTE signal and Wi-Fi signal may be received in a same frequency band (e.g., a range of frequencies generally associated with a channel in which a wireless device may transmit or receive signals, such as but not limited to a 2.4 GHz or 5 GHz unlicensed frequency band). The wireless device can have modem components (e.g., modem processors and/or other associated hardware and software) for processing the different signals, depending on a desired signal to be transmitted or received.

Because the wireless device is operating in shared, unlicensed spectrum, typically the wireless device will need to perform a clear channel assessment (CCA) procedure, also referred to as a listen before talk (LBT) procedure, to determine if a channel in which the wireless device desires to transmit is substantially free from other transmissions. In an aspect, according to the present solution, the modem components for two RAT types can be communicatively coupled, such that the modem components can share information useful for reducing interference between transmissions to thereby enable better coexistence between different RATs using a shared frequency spectrum.

In an aspect, a wireless device can use a modem operating based on or according to a first RAT (e.g., Wi-Fi) to detect an energy level associated with at least one received first RAT message. The wireless device can use the detected energy level value when performing an adapted energy detection method to determine the interference level in the channel, ultimately determining whether the channel is occupied. In an aspect, the receiver operating based on a first RAT can receive one or more messages operating based on the first RAT. Each of these first RAT messages can be produced by network entities operating based on the first RAT. In an aspect, each of these network entities can produce a first RAT message in response to a transmission by the wireless device. In an aspect, the transmission produced by the wireless device has a signature (e.g., a preamble) associated with the first RAT.

In an aspect, the modem operating based on the first RAT can send the detected energy level value to a modem operating based on or according to a second RAT (e.g., LTE) in the wireless device. In an aspect, the first RAT modem can send the detected energy level value to a controller connected to both modems, which may periodically send the most recent detected energy level value to the second RAT modem. In an aspect, the controller can be a hardware or software controller that passes information associated with the messages received by the first RAT modem. In an aspect, the controller can send, in addition to an energy level value (e.g., a received signal strength indication (RSSI)), other information including, for example, header information, such as Media Access Control (MAC) header information associated with the incoming message. In an aspect, the second RAT modem can use the information received from the controller in an adapted energy detection (AED) operation, for example, to differentiate between a message sent by a Wi-Fi device from a message sent by an LTE device using a Wi-Fi preamble.

In an aspect, the energy threshold computation for the AED operation can be performed by either of the first RAT modem or the second RAT modem. In an aspect, the respective modem can use the detected energy level determined by the first RAT modem to update an energy detection threshold (e.g., a threshold amount of detected energy in a channel that would cause the second modem to not transmit) such that the results of the AED operation can be a function of the energy level of the messages received by the first RAT modem. In an aspect, the first RAT modem can periodically update the detected energy level value. In such instances, the results of the AED operation can be a function of the first RAT messages received by the first RAT modem during the most recent interval.

Thus, for example, the present aspects may enable coexistence between LTE transmissions and Wi-Fi transmissions in shared frequency spectrum. For instance, in a particular case that should not be construed as limiting, according to the present aspects, by observing relatively long term statistics of detected energy levels from a co-located Wi-Fi modem, the LTE modem can adaptively lower its energy detection threshold to allow for deferring for future Wi-Fi transmissions.

FIG. 1A illustrates several nodes of a sample communications system 100 (e.g., a portion of a communication network). For illustration purposes, various aspects of the disclosure will be described in the context of one or more access terminals, access points (APs), and network entities (NEs) that communicate with one another. It should be appreciated, however, that the teachings herein may be applicable to other types of apparatuses or other similar apparatuses that are referenced using other terminology. For example, in various implementations, access points may be referred to or implemented as: base stations, NodeBs, eNodeBs, Home NodeBs, Home eNodeBs, small cells, macro cells, femto cells, etc. In a similar manner, access terminals may be referred to or implemented as user equipment (UEs), mobile stations, and so on.

The term "small cell," as used herein, refers to a relatively low transmit power and/or a relatively small coverage area cell as compared to a transmit power and/or a coverage area of a macro cell. Further, the term "small cell" may include, but is not limited to, cells such as: a femto cell, a pico cell, access point base stations, Home NodeBs, or femto access points. For instance, a macro cell may cover a relatively-large geographic area, such as, but not limited to, several kilometers in radius. In contrast, a pico cell may cover a relatively small geographic area, such as, but not limited to, a building. Further, a femto cell also may cover a relatively small geographic area, such as, but not limited to, a home, or a floor of a building.

The present disclosure relates in some aspects to techniques that facilitate concurrent reception and decoding of signals from two or more RAT types. For convenience, the use, operation, extension, and/or adaptation of LTE and/or LTE Advanced for applications in an unlicensed radio-frequency (RF) band may be referred to herein as "LTE/LTE Advanced in unlicensed spectrum," "adapting LTE/LTE Advanced in unlicensed spectrum," "extending LTE/LTE Advanced to unlicensed spectrum," and "LTE/LTE Advanced communications over unlicensed spectrum" etc. Moreover, a network or device that provides, adapts, or extends LTE/LTE Advanced in unlicensed spectrum may refer to a network or device that is configured to operate in a contention-based radio frequency band or spectrum.

In an aspect, the communications system 100 may include various devices that may communicate using a shared portion of the spectrum. In one example, the shared portion of the spectrum may include an unlicensed portion of the spectrum. A shared portion of the spectrum may include any frequency band that, for example, allows usage by more than one technology or network. For example, devices may use a portion of a 5 GHz band, which may also be referred to as an unlicensed national information infrastructure (U-NII) radio band.

Access points in system 100 can provide access to one or more services (e.g., network connectivity) for one or more wireless terminals (e.g., access terminal 102 or access terminal 104) that may be installed within or that may roam throughout a coverage area of system 100. For example, at various points in time, access terminal 102 may connect to access point 106 or some other access point in system 100, such as access point 108. Similarly, access terminal 104 can connect to access point 106, access point 108, or some other access point.

One or more of the access points can communicate with one or more network entities (represented, for convenience, by network entities 110), including each other, to facilitate wide-area network (WAN) connectivity. Two or more of such network entities can be co-located and/or two or more of such network entities can be distributed throughout a network.

A network entity may take various forms such as, for example, one or more radio and/or core network entities. Thus, in various implementations, network entities 110 can represent functionality, such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique, controlling paging for access terminals, and/or providing access control for access terminals.

Access point 106 can be a wireless device that includes a first RAT radio 112 and a second RAT radio 114. First RAT radio 112 can be connected to second RAT radio 114 through an interface 116. When access point 106 (or any other devices in system 100) uses a second RAT (via second RAT radio 114) to communicate on a given resource, this communication may be subjected to interference from nearby devices (e.g., access terminal 104 and/or access point 108) that use the first RAT to communicate. For example, communication by access point 106 via LTE radio 114 on a particular unlicensed RF band can be subject to interference from access terminal 104 and access point 108 operating on that band. For convenience, LTE on an unlicensed RF band may be referred to herein as LTE/LTE Advanced in unlicensed spectrum, LTE-U, or simply LTE in the surrounding context.

In some systems, LTE in unlicensed spectrum can be employed in a standalone configuration, with all carriers operating exclusively in an unlicensed portion of the wireless spectrum (e.g., LTE Standalone). In other systems, LTE-U can be employed in a manner that is supplemental to licensed band operation by providing one or more unlicensed carriers operating in the unlicensed portion of the wireless spectrum in conjunction with an anchor, licensed carrier operating in the licensed portion of the wireless spectrum (e.g., LTE Supplemental DownLink (SDL)). In either case, carrier aggregation (CA) can be employed to manage different component carriers, with one carrier serving as the Primary Cell (PCell) for the corresponding user equipment (UE) (e.g., an anchor, licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell can provide additional downlink capacity, as desired.

In general, LTE uses orthogonal frequency division multiple access (OFDMA) on the downlink and single-carrier frequency division multiplexing (SC-FDM) on the uplink. OFDMA and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDMA and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) can use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation methods have been proposed, continuous CA and non-continuous CA. Continuous CA occurs when multiple available component carriers are adjacent to each other. Alternatively, non-continuous CA occurs when multiple, non-adjacent, available component carriers are separated along the frequency band. Both non-continuous and continuous CA can aggregate multiple component carriers to serve a single unit of LTE-Advanced UEs.

In an aspect, access terminal 102 and/or access point 106 can be configured for communication operating based on or according to two or more RAT types. In an aspect, access terminal 102 and/or access point 106 can include a multi-modem component 120. In an aspect, the term "component" as used herein may be one of the parts that make up a system, may be hardware or software, and may be divided into other components. Multi-modem component 120 can integrate an RF front-end 122, two or more RAT modems, such as LTE modem 130 and Wi-Fi modem 140, and a controller 150. In an aspect, multi-modem component 120 can be formed on a single silicon die. In an aspect, multi-modem component 120 can also be implemented on the single silicon die as a converged LTE and Wi-Fi modem having aspects implemented using software-defined radio. Multi-modem component 120 can change the allocation of resources such as carriers, antennas, and computing resources to be used among the two or more RATs. Multi-modem component 120 can also support multiple operating modes; for example, supporting backward compatibility with legacy protocols.

RF front-end 122 may include hardware and/or software means for receiving a combined RF signal. For example, RF front-end 122 can include a plurality of distinct radio antennas 124. Antennas 124 can be spatially separated to provide receive diversity. In an aspect, RF front-end 122 can further include other receive chain front-end components, such as analog filters and analog-to-digital (A/D) converter 126.

LTE modem 130 can include hardware such as circuitry, one or more processors, memory, and/or other means for processing LTE signals. For example, LTE modem 130 can be configured to process signals for LTE in unlicensed spectrum. In an aspect, for example, LTE modem 130 can include a receiver 132, a transmitter 134, and a filter 136. In an aspect, LTE modem 130 can be configured to perform interference detection operations, such as, for example, energy detection operations to determine the interference level of a channel.

In an aspect, LTE modem 130 can use a energy-level threshold to determine the presence of other network entities, including, for example, access terminal 104, access point 108, and/or network entities 110. When LTE modem 130 senses an energy level above the energy-level threshold, LTE modem 130 can determine that the interference level is indicative of the presence of one or more entities operating based on or according to the first RAT. In an aspect, LTE modem 130 can, via controller 150, receive energy-level values from Wi-Fi modem 140. In such instances LTE modem 130 can adjust the energy-level threshold used in its energy detection operations to that of the energy-level value received from Wi-Fi modem 140.

LTE receiver 132 can be configured to receive and decode an LTE radio signal received from RF front-end 122. In an aspect, receiver 132 can further be configured to generate a channel estimate for the LTE signal based on the decoded LTE signal.

LTE transmitter 134 can be configured to generate a modulated LTE signal based on digital input, such as a MAC transport block. In an aspect, transmitter 134 can receive digital input from a protocol stack of the wireless device (e.g., a protocol stack included in access terminal 102 or access point 106). In another aspect, transmitter 134 can receive digital input in the form of a demodulated received signal. Transmitter 134 can receive the demodulated received signal from receiver 132 and remodulate the signal to produce a new LTE signal. In an aspect, the remodulated LTE signal can be used to configure a cancellation filter for improving the second RAT signal.

Filter 136 can include one or more digital filters configured to improve a signal quality of an incoming LTE signal. For example, filter 136 can be a space-time filter configured to reduce interference from a first RAT signal. Space-time filter 136 can be configured based on a channel estimate provided by a first RAT receiver (here, Wi-Fi receiver 142). In another aspect, filter 136 can be a cancellation filter. A cancellation filter can be used to cancel a first RAT signal from the LTE signal. The cancellation filter may be configured based on a first RAT signal generated by a first RAT transmitter such as the transmitter 144.

The Wi-Fi modem 140 may include hardware configured to process Wi-Fi signals. In an aspect, for example, Wi-Fi modem 140 can include a receiver 142, a transmitter 144, and a filter 146. In an aspect, Wi-Fi modem 140 can be configured to send out transmissions and receive messages from network entities, with Wi-Fi modem 140 determining power levels of the received messages. In an aspect, Wi-Fi modem 140 can send a determined power level to LTE modem 130 for interference level operations, such as power detection operations. In an aspect, Wi-Fi modem 140 can perform power detection using the power level it determined upon receipt of the messages.

Wi-Fi receiver 142 can be configured to receive and decode a Wi-Fi radio signal received from RF front-end 122. In an aspect, receiver 142 can further be configured to generate a channel estimate for the Wi-Fi signal based on the decoded Wi-Fi signal. In an aspect, Wi-Fi receiver 142 can be configured to receive messages from one or more network entities, such as access terminal 104, access point 108 and/or network entities 110. In an aspect, the messages Wi-Fi receiver 142 receives can be in response to transmissions sent by Wi-Fi transmitter 144. In an aspect, Wi-Fi modem 140 can use components and/or attributes of the received message, such as the message header or a measured energy level, to associate attributes with the received message. In an aspect, Wi-Fi modem 140 can send one or more of these attributes to LTE modem 130.

Wi-Fi transmitter 144 can be configured to generate a modulated Wi-Fi signal based on digital input, such as a MAC transport block. In an aspect, Wi-Fi transmitter 144 can receive digital input from a protocol stack of the wireless device (e.g., a protocol stack included in access terminal 102 or access point 106). In another aspect, transmitter 144 can receive digital input in the form of a demodulated received signal. Transmitter 144 can receive the demodulated received signal from receiver 142. Transmitter 144 can remodulate the demodulated received signal to generate a new Wi-Fi signal. In an aspect, the new Wi-Fi signal can be used, for example, to configure a cancellation filter for improving a second RAT signal.

In another aspect, Wi-Fi transmitter 144 can be configured to send transmissions to other network entities operating based on or according to the first RAT. In an aspect, the transmissions can be messages that include signatures (e.g., preambles) for the first RAT. For example, Wi-Fi modem 140 can receive an indication of LTE modem 130 planning to send an LTE transmission message, e.g., in the frequency or channel that may be shared between the modems. Wi-Fi modem 140 can configure transmitter 144 to send a message (e.g., a channel usage or channel reservation message) to other devices operating based on or according to the first RAT preceding the LTE transmission in order to clear the channel for the LTE transmission message. In another aspect, transmitter 144 can be configured to send a transmission to trigger network entities operating based on or according to the first RAT to send messages that are to be received by receiver 142. Wi-Fi modem 140 can use the received messages to detect energy levels of each of the received first RAT messages.

Filter 146 can include one or more digital filters configured to improve a signal quality of an incoming Wi-Fi signal. For example, filter 146 may be a space-time filter configured to reduce interference from a second RAT signal. Space-time filter 146 can be configured based on a channel estimate provided by a second RAT receiver (here, LTE receiver 132). Space-time filter 146 can be configured as an LTE nuller to null out one or more LTE streams. In another aspect, filter 146 can be a cancellation filter. A cancellation filter can be used to cancel a second RAT signal from the Wi-Fi signal. The cancellation filter can be configured based on a second RAT signal generated by a first RAT transmitter such as the transmitter 144.

Controller 150 can be hardware and/or software code or instructions executable by a processor for transmitting data and messages between LTE modem 130 and Wi-Fi modem 140. In an aspect, controller 150 can perform processing for data being transmitted and received via modems 130, 140. Controller 150 can control the operation of various circuits within modems 130, 140. In an aspect, controller 150 can receive messages from Wi-Fi modem 140 and can send those messages to LTE modem 130. In an aspect, the messages that controller 150 receives from Wi-Fi modem 140 can be statistical messages, such as messages that include an updated energy level value and/or header information associated with received first RAT messages. In an aspect, controller 150 can wait for specified periods (e.g., 100 ms to 1 second) before sending the statistical messages to LTE modem 130.

Figure 1B:
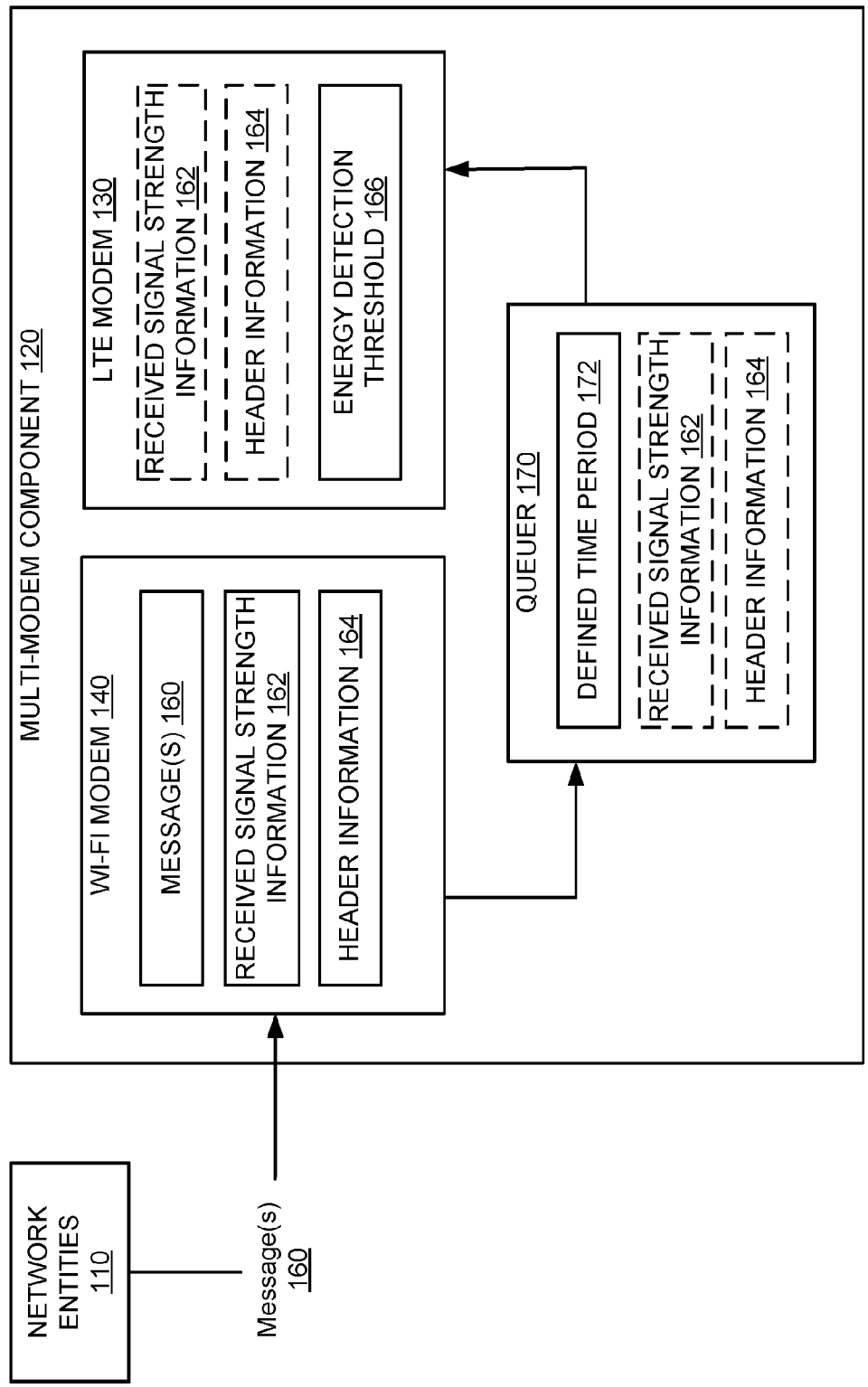
FIG. 1B is a block diagram illustrating a multi-modem component in accordance with some aspects of the present disclosure.

FIG. 1B is a block diagram illustrating multi-modem component 120 in accordance with some aspects of the present disclosure. In some aspects, multi-modem component 120 may be configured to perform adaptive energy detection based on the interaction between LTE modem 130 and Wi-Fi modem 140. For example, LTE modem 130 may use measurements (e.g., RSSI) from Wi-Fi modem 140 in a fast time scale (e.g., defined time period 172) to adjust the clear channel assessment (CCA) or listen-before-talk (LBT) energy detection behavior of LTE modem 130, thereby enabling coexistence between LTE and Wi-Fi technologies.

Specifically, Wi-Fi modem 140 of multi-modem component 120 may initially receive one or more messages 160 from network entities 110. For example, Wi-Fi modem 140 may receive the one or more messages 160 as part of performing preamble detection on one or more communication channels, e.g., including a frequency or channel in which LTE modem 130 may transmit. As Wi-Fi modem 140 receives each one of the one or more messages 160, corresponding received signal strength measurements may be made, detected or otherwise determined. That is, Wi-Fi modem 140 may be configured to determine one or both of received signal strength information 162 and/or header information 164 (e.g., detected preambles; e.g., to discern between 802.xx preambles transmitted by Wi-Fi devices and LTE devices sending 802.xx preambles, in a case where LTE devices are configured to send 802.xx preambles as a part of the LTE transmission to make Wi-Fi nodes defer to LTE transmissions in the shared spectrum) for the one or more messages 160.

In some aspects, received signal strength information 162 may be or otherwise include an RSSI value of one or more decoded preambles over defined time period 172. Additionally, in some aspects, header information 164 may include MAC layer header information for or associated with one or more messages 160.

Wi-Fi modem 140 may then provide or send one or both of received signal strength information 162 or header information 164 to queuer 170, which may be configured to queue the measurements for defined time period 172. For example, time period 172 may be a configured amount of time having a value that varies depending on how quickly an operator of the present aspects may want to adjust energy detection threshold 166 used for detecting Wi-Fi activity and deferring LTE transmissions using the shared frequency or channel, or based on how accurate of a statistical sample is desired by the operator. For instance, time period 172 may range from a low value corresponding to how quickly received signal strength information 162 or header information 164 can be transmitted to LTE modem 130 (such as, but not limited to, 100 ms) to a high value corresponding to a good statistical sample (such as, but not limited to, 1 second; based on a typical Wi-Fi transmission lasting 5 ms-10 ms and 100 samples being a good statistical sample size). Hence, received signal strength information 162 and/or header information 164 may be provided to LTE modem 130 periodically or when a sufficient sampling size has been met (e.g., according to defined time period 172). Upon a determination by queuer 170 that defined time period 172 has elapsed or been met (e.g., N ms, where N is a positive number), queuer 170 may be configured to provide or send received signal strength information 162 and/or header information 164 to LTE modem 130.

As such, in an aspect, LTE modem 130 may be configured to adjust energy detection threshold 166 based on the received signal strength information 162 and/or header information 164. For instance, energy detection threshold 166 may be a threshold having a value that indicates whether or not a frequency or channel is sufficiently clear of other transmissions, or noise, or interference, to allow LTE modem 130 to transmit on that frequency or channel (e.g., channel is clear if a detected amount of received energy does not meet the threshold).

In another aspect, Wi-Fi modem 140 or queuer 170 or LTE modem 130 may filter received signal strength information 162 such that only the received signal strength information 162 from Wi-Fi device transmissions are considered when adjusting energy detection threshold 166. For instance, the filtering may be based on the header information 164, which allows for discerning between 802.xx preambles transmitted by Wi-Fi devices and LTE devices sending 802.xx preambles. As such, in this aspect, energy detection threshold 166 may be more specifically defined as a threshold having a value that indicates whether or not a frequency or channel is sufficiently clear of Wi-Fi device transmissions to allow LTE modem 130 to transmit on that frequency or channel (e.g., channel is clear if a detected amount of received energy does not meet the threshold). For example, in this aspect, LTE modem 130 may be configured to not defer transmissions in the presence of other LTE transmissions in the shared frequency or channel, as LTE-enabled devices and LTE transmissions are configured to allow for interference cancellation or to otherwise enable decoding of overlapping LTE transmissions.

Additionally, in an aspect, the received signal strength information 162 and/or header information 164 for the one or more messages 160 may be associated with a same frequency or channel in which LTE modem 130 may transmit, e.g., in a shared frequency spectrum.

In some aspects, LTE modem 130 may be configured to lower or reduce energy detection threshold 166 based on received signal strength information 162 and/or header information 164 associated with the one or more messages 160. For example, in an aspect, the lowered or reduced energy detection threshold 166 may have a value that is less than an energy detection value dictated by European Telecommunications Standards Institute (ETSI) specifications for clear channel assessment (CCA) in Wi-Fi frequency spectrum. For instance, LTE modem 130 may be configured to lower or reduce energy detection threshold 166 as a function of the obtained received signal strength information 162 in order to ensure that any Wi-Fi device transmissions are considered when determining whether to defer a transmission by LTE modem 130 in the same frequency or channel shared with the Wi-Fi transmission. As such, in this case, the function that may be used by LTE modem 130 may be a function that adjusts energy detection threshold 166 to a value that corresponds to or that represents a value of a lowest level (e.g., in dBm) Wi-Fi transmission in the received signal strength information 162. In some aspects, LTE modem 130 may increase energy detection threshold 166 (e.g., relative to a prior value) based on received signal strength information 162 and/or header information 164 (although the increased value may still be below an energy detection value dictated by ETSI specifications for CCA in a Wi-Fi frequency spectrum).

Thus, LTE modem 130 may be configured to adjust energy detection threshold 166 as a function of received signal strength information 162 and/or header information 164 based on the observed Wi-Fi activity detected by Wi-Fi modem 140.

As such, LTE modem 130 may fine-tune a value of energy detection threshold 166 using the preamble detection measurements (e.g., received signal strength information 162 and/or header information 164) provided by Wi-Fi modem 140. By doing so, a finer-tuned energy detection threshold 166 may be used at LTE modem 130 to ensure that it sufficiently defers to actual detected Wi-Fi transmissions in the unlicensed medium, thereby reducing interference between technologies. Accordingly, multi-modem component 120 may enable coexistence between LTE and Wi-Fi technologies operating in a shared frequency spectrum, and, in particular, between LTE signals and Wi-Fi signals transmitted and/or received in a same frequency band, such as but not limited to a 2.4 GHz or 5 GHz unlicensed frequency band.

Figure 2:
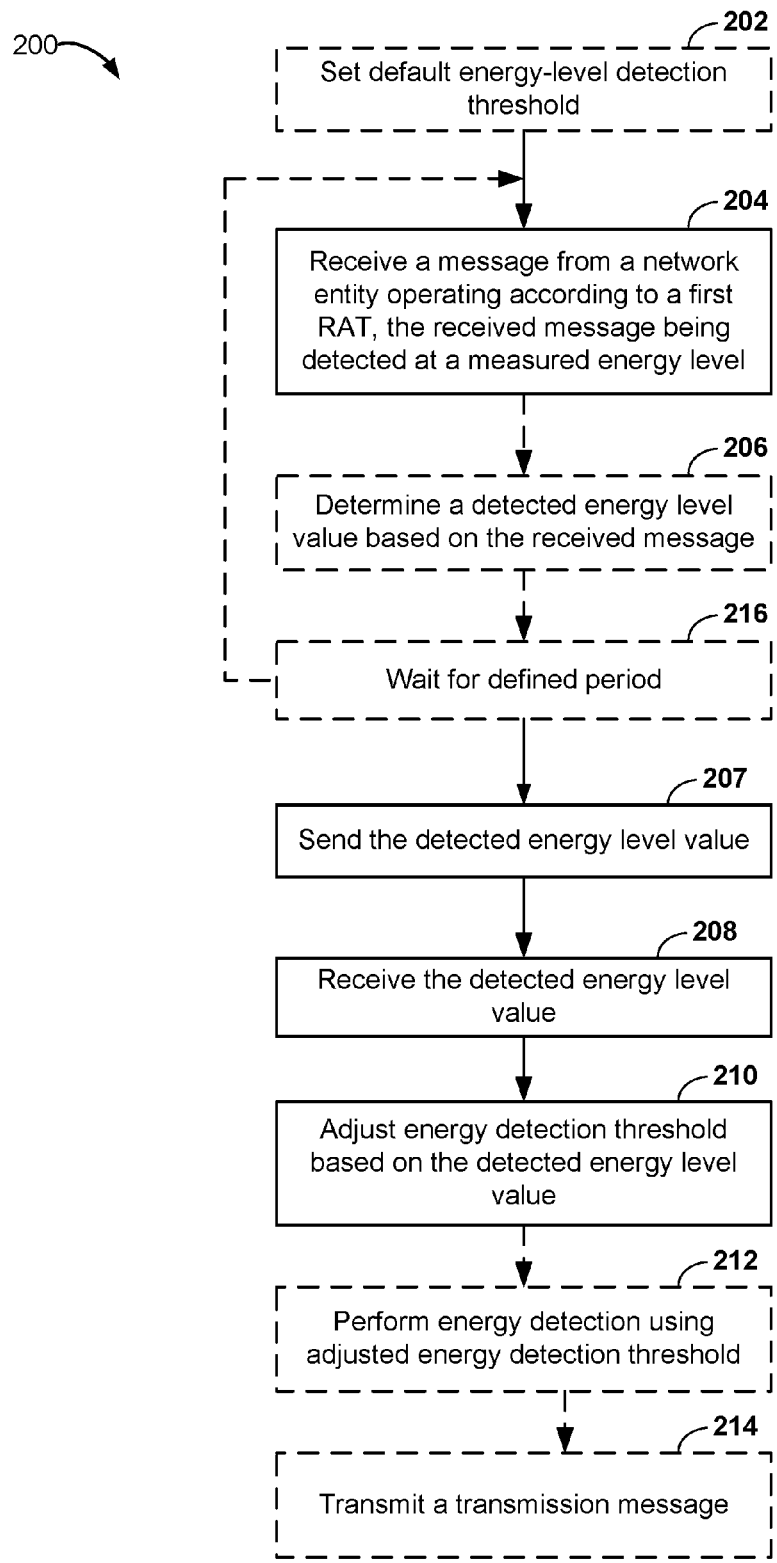
FIG. 2 is a flow diagram illustrating aspects of a method for interference detection using adaptive energy detection.

FIG. 2 illustrates an example method 200 for adaptive energy detection for interference detection in a wireless channel. Method 200 can be performed, for example, by an access terminal 102 (FIG. 1A) and/or an access point 106 (FIG. 1A), including a multi-modem component 120 (FIGS. 1A and 1B).

In an aspect, at block 202, method 200 can optionally include setting a default energy-level detection threshold. In an aspect, for example, LTE modem 130 (FIGS. 1A and 1B) can set a default energy-level detection threshold for use in energy detection operations such that energy levels detected in the channel above the threshold indicate a high interference level in the channel. In an aspect, the default energy-level detection threshold can be set as a ceiling such that LTE modem 130 (FIGS. 1A and 1B) does not subsequently alter the threshold to be a value above the default. For example, the default energy level value can be, but is not limited to, an energy detection value dictated by ETSI specifications for CCA in a Wi-Fi frequency spectrum.

At block 204, method 200 can include receiving a message from a network entity operating based on or according to a first RAT, the received message being detected at a measured energy level. In an aspect for example, Wi-Fi receiver 142 (FIG. 1A) can receive a Wi-Fi message from another network entity, such as access terminal 104 (FIG. 1A) or access point 108 (FIG. 1A). Each Wi-Fi message received by receiver 142 (FIG. 1A) has attributes, such as the energy level of the message or a Wi-Fi header as a component of the Wi-Fi message. In an aspect, the measured energy level of the received Wi-Fi message can be a received signal strength indication (RSSI), which indicates the relative signal strength received by one of antennas 124 (FIG. 1A) when receiving the preamble of a Wi-Fi frame. In another aspect, the energy level associated with the received Wi-Fi message can be a received channel power indicator (RCPI), which indicates the relative signal strength received by one of the antennas 124 (FIG. 1A) when receiving the entire Wi-Fi frame.

At block 206, method 200 can optionally include determining the detected energy level value based on received messages from each network entity operating based on or according to the first RAT. In an aspect, for example, Wi-Fi modem 140 (FIGS. 1A and 1B) can receive at least one Wi-Fi frame from each network entity operating based on Wi-Fi, such as access terminal 104 (FIG. 1A) and access point 108 (FIG. 1A). In an aspect, when receiving more than one Wi-Fi frame (indicating the presence of more than one network entity operating based on the first RAT), Wi-Fi modem 140 (FIGS. 1A and 1B) can detect measured energy levels associated with each received first RAT message and set the detected energy level value to equal that of the lowest measured energy level from the group of received first RAT messages. Further, for example, determining the detected energy level may include determining, by Wi-Fi modem 140 (FIGS. 1A and 1B), a minimum measured energy level among a plurality of measured energy levels including a measured energy level of the received message and a subsequent measured energy level of a subsequent message (where the messages may be from a same or a different transmitting entity). So, in this example, Wi-Fi modem 140 (FIGS. 1A and 1B) may set the detected energy level value as the minimum measured energy level of the received message and the subsequent message. It should be understood that other values besides the minimum measured energy level of the received message and the subsequent message, such as some other value that approximates or corrects the lowest received signal strength of a signal that may be received from a Wi-Fi device transmitting in the shared frequency or channel.

At block 207, method 200 can include sending the detected energy level value. In an aspect, for example, Wi-Fi modem 140 (FIGS. 1A and 1B) can send a detected energy level value to LTE modem 130 (FIGS. 1A and 1B). In an aspect, the detected energy level value can be the detected energy level value set by Wi-Fi modem 140 (FIGS. 1A and 1B) at block 206.

At block 208, method 200 can include receiving the detected energy level value. In an aspect, for example, LTE modem 130 (FIGS. 1A and 1B) can receive a detected energy level value from Wi-Fi modem 140 (FIGS. 1A and 1B). In an aspect, LTE modem 130 (FIGS. 1A and 1B) can receive the detected energy level value in a statistical message sent form Wi-Fi modem 140 (FIGS. 1A and 1B) through controller 150 (FIG. 1A).

In an aspect, LTE modem 130 (FIGS. 1A and 1B) at block 208 can also receive header information from Wi-Fi modem 140 (FIGS. 1A and 1B). For example, LTE modem 130 (FIGS. 1A and 1B) can receive a statistical message that includes both energy level information (e.g., the detected energy level value) and header information. In such instances, LTE modem 130 (FIGS. 1A and 1B) can filter the information included in the statistical message to only include information relating to messages sent using the first RAT.

At block 210, method 200 can include adjusting the energy-level detection threshold based on the detected energy level value. In an aspect, for example, LTE modem 130 (FIGS. 1A and 1B) can adjust the energy-level detection threshold from the default value set at block 202 to a value based on the detected energy level value. For example, LTE modem 130 (FIGS. 1A and 1B) can adjust the energy-level detection threshold such that its value is equal to the detected energy level value received from Wi-Fi modem 140 (FIGS. 1A and 1B). Alternatively, LTE modem 130 can adjust the energy-level detection threshold to be a function of the detected energy level value received from Wi-Fi modem 140. For example, the function may be any function that adjusts energy-level detection threshold to a value that approximates a lowest signal strength detected as being transmitted by a Wi-Fi device. For instance, the function may include, but is not limited to, a functions that adjusts the energy-level detection threshold to a minimum of the detected energy level values, or some corrected or adjusted value that corresponds to a minimum of the detected energy level values (e.g., to account for errors in the detected energy level).

In some aspects, as part of block 210, method 200 may determine whether the detected energy level value is at or below the default energy detection threshold (e.g., an energy detection value dictated by ETSI specifications for CCA in a Wi-Fi frequency spectrum). In accordance with a determination that the detected energy level value is at or below a default energy detection threshold, method 200 may adjust the detected energy level value. Further, in some aspects, adjusting the energy detection threshold includes reducing the energy detection threshold based on the detected energy level value received from the first modem. Additionally, in some aspects, adjusting the energy detection threshold includes adjusting as a function of the detected energy level value.

At block 212, method 200 can optionally include performing energy detection using the adjusted energy-level detection threshold. In an aspect, for example, LTE modem 130 (FIGS. 1A and 1B) can perform an adapted energy detection (AED) operation that sets an energy detection threshold as function of the detected energy level value. For example, LTE modem 130 (FIGS. 1A and 1B) can perform an AED operation while using the detected energy level value as a value of an updated energy-level detection threshold to determine whether the level of interference in the channel indicates activity by a network entity operating based on or according to the first RAT.

In an aspect, at block 214, method 200 may optionally include transmitting a transmission message. For example, in an aspect, LTE modem 130 may transmit a transmission message in response to determining that the frequency or channel is sufficiently free from interference, e.g., when the detected energy level value is less than or does not satisfy the updated energy-level detection threshold. In an aspect, the transmission message may include a first signature (e.g., a Wi-Fi preamble and/or other header information) recognized by the at least one network entity operating according to the first RAT and a second signature (e.g., an LTE preamble and/or header information) recognized by one or more network entities operating according to the second RAT. As such, transmission message with the first and second signatures may be recognized by a receiving device having a Wi-Fi modem as well as a receiving device having an LTE modem, thereby enabling proper delivery of the transmission message and/or use of the transmission message by other devices implementing multi-modem component 120 as described herein.

Moreover, in another aspect, the transmission message may be a frequency or channel reservation or channel usage message. For instance, in an aspect, an AED operation that determines a high interference level can cause Wi-Fi modem 140 (FIGS. 1A and 1B) to optionally transmit a transmission message to other network entities operating based on or according to the first RAT to defer transmissions such that the interference level in the channel lowers and it is clear to send transmissions in the channel using LTE modem 130 (FIGS. 1A and 1B). In such instances, subsequent AED operations performed by LTE modem 130 (FIGS. 1A and 1B) would indicate that the interference level does not indicate other transmissions being performed by network entities operating based on or according to the first RAT; as such, LTE modem 130 (FIGS. 1A and 1B) could send LTE transmissions in the channel operating based on the second RAT.

At block 216, method 200 can optionally include waiting for a defined period before sending the detected energy level value. In an aspect, for example, Wi-Fi modem 140 (FIGS. 1A and 1B) can receive messages and set a detected energy level value at defined periods. For example, Wi-Fi modem 140 (FIGS. 1A and 1B) can determine the energy level of received messages periodically, e.g., every defined time period 172 such as N ms (where N=10, 20, 100, etc.), with LTE modem 130 (FIGS. 1A and 1B) receiving updated detected energy levels every N ms. For example, method 200 at block 204 may include may include receiving (e.g., via Wi-Fi modem 140, FIGS. 1A and 1B) a plurality of messages from one or more network entities operating according to the first RAT, including at least a first message and a subsequent message. Further, at block 206, the respective detected energy values are determined, and the receiving of messages and determining of detected energy values may continue for the defined time period 172. Additionally, method 200 may determine that the defined time period 172 has elapsed, and thus Wi-Fi modem 140 then sends, to LTE modem 130 (FIGS. 1A and 1B), a detected energy level value based at least on the measured energy levels of the messages received during the defined time period 172. As such, at the end of every defined period, Wi-Fi modem 140 may provide an updated detected energy level value to LTE modem 130 based on the detected Wi-Fi transmissions received during the defined time period 172.

Figure 3:
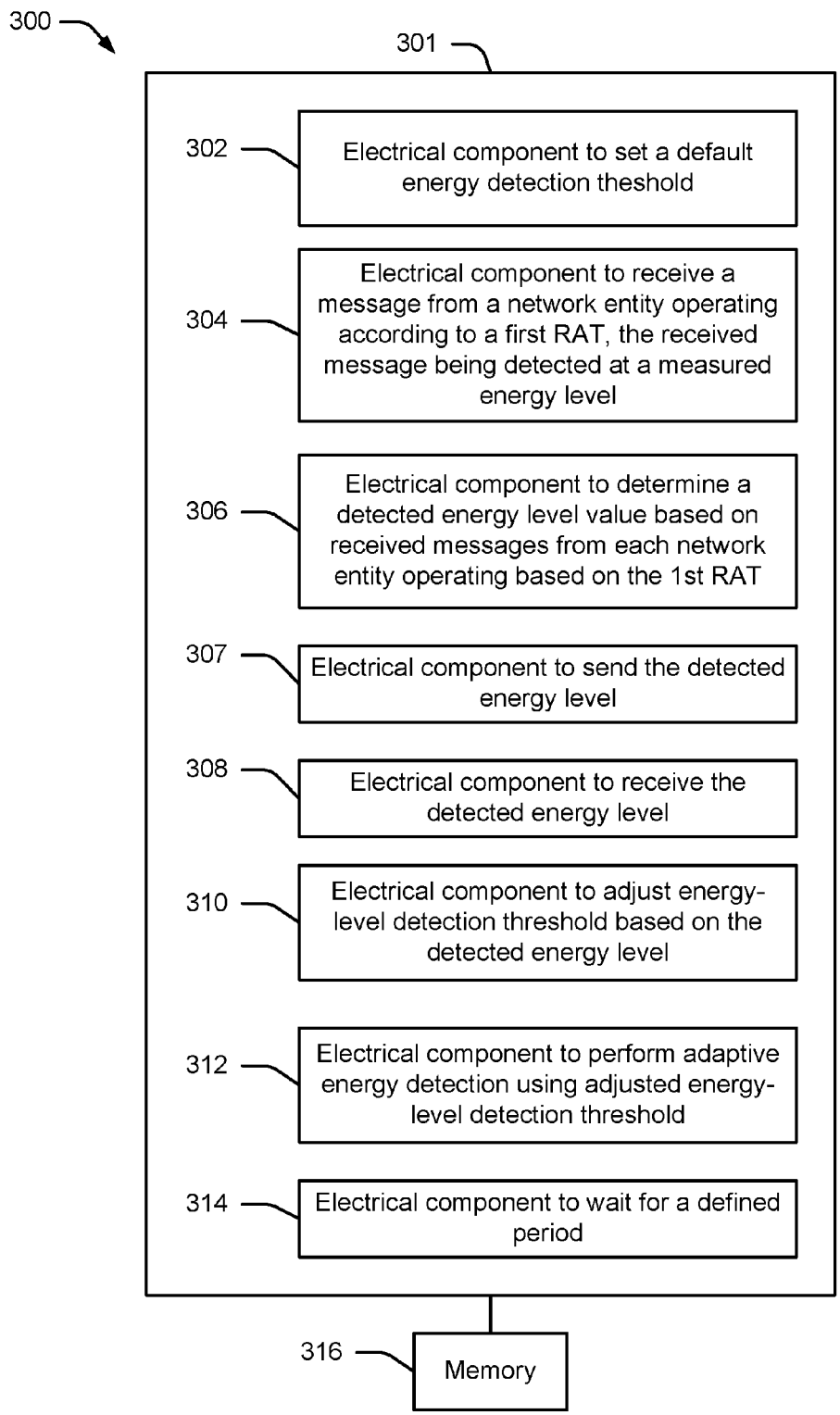
FIG. 3 is a block diagram illustrating aspects of a logical grouping of electrical components as contemplated by the present disclosure.

Referring to FIG. 3, an example system 300 for adaptive energy detection in unlicensed spectrum is illustrated. System 300 can be included, for example, in an access terminal 102. Other wireless devices such as, for example, access terminal 104 and access points 106, 108 can also include a system 300 for interference mitigation in unlicensed spectrum. It is to be appreciated that system 300 is represented as including functional blocks, which can be functional blocks that represent functions implemented by a processor, software, or combination thereof (for example, firmware).

System 300 includes a logical grouping 301 of electrical components that can act in conjunction. For instance, logical grouping 301 can include an electrical component 302 for setting a default energy-level detection threshold. Electrical component 302 can comprise LTE modem 130 or Wi-Fi modem 140 (FIGS. 1A and 1B).

Additionally, logical grouping 301 can include an electrical component 304 for receiving a message from a network entity operating based on or according to a first RAT. In an aspect, the received message is detected at a measured energy level. Electrical component 304 can comprise receiver 132 (FIG. 1A).

Additionally, logical grouping 301 can include an electrical component 306 for determining the detected energy level value. Electrical component 306 may comprise Wi-Fi modem 140 (FIGS. 1A and 1B).

Additionally, logical grouping 301 can include an electrical component 307 for sending a detected energy level value. Electrical component 307 may comprise LTE modem 130 or Wi-Fi modem 140 (FIGS. 1A and 1B).

Additionally, logical grouping 301 can include an electrical component 308 for receiving the detected energy level value. Electrical component 308 may comprise LTE modem 130 or Wi-Fi modem 140 (FIGS. 1A and 1B).

Additionally, logical grouping 301 can include an electrical component 310 for adjusting the energy-level detection threshold based on the detected energy level value. Electrical component 310 may comprise LTE modem 130 or Wi-Fi modem 140 (FIGS. 1A and 1B).

Additionally, logical grouping 301 can include an electrical component 312 for performing energy detection operating based on or according to the adjusted energy detection threshold. In an aspect, the electrical component 312 may comprise LTE modem 130 or Wi-Fi modem 140 (FIGS. 1A and 1B).

Additionally, logical grouping 301 can include electrical components 314 for waiting for a defined period. Electrical component 310 may comprise LTE modem 130 or Wi-Fi modem 140 (FIGS. 1A and 1B).

Additionally, system 300 can include a memory 316 that retains instructions for executing functions associated with the electrical components 302, 304, 306, 307, 308, 310, 312, and 314 stores data used or obtained by the electrical components 302, 304, 306, 307, 308, 310, 312, and 314. While shown as being external to memory 316, it is to be understood that one or more of the electrical components 302, 304, 306, 307, 308, 310, 312, and 314 can exist within memory 316. In one example, electrical components 302, 304, 306, 307, 308, 310, 312, and 314 can comprise at least one processor, or each electrical component 302, 304, 306, 307, 308, 310, 312, and 314 can be a corresponding module of at least one processor. Moreover, in an additional or alternative example, electrical components 302, 304, 306, 307, 308, 310, 312, and 314 can be a computer program product including a computer-readable medium, where each electrical component 302, 304, 306, 307, 308, 310, 312, and 314 can be corresponding code.

Figure 4:
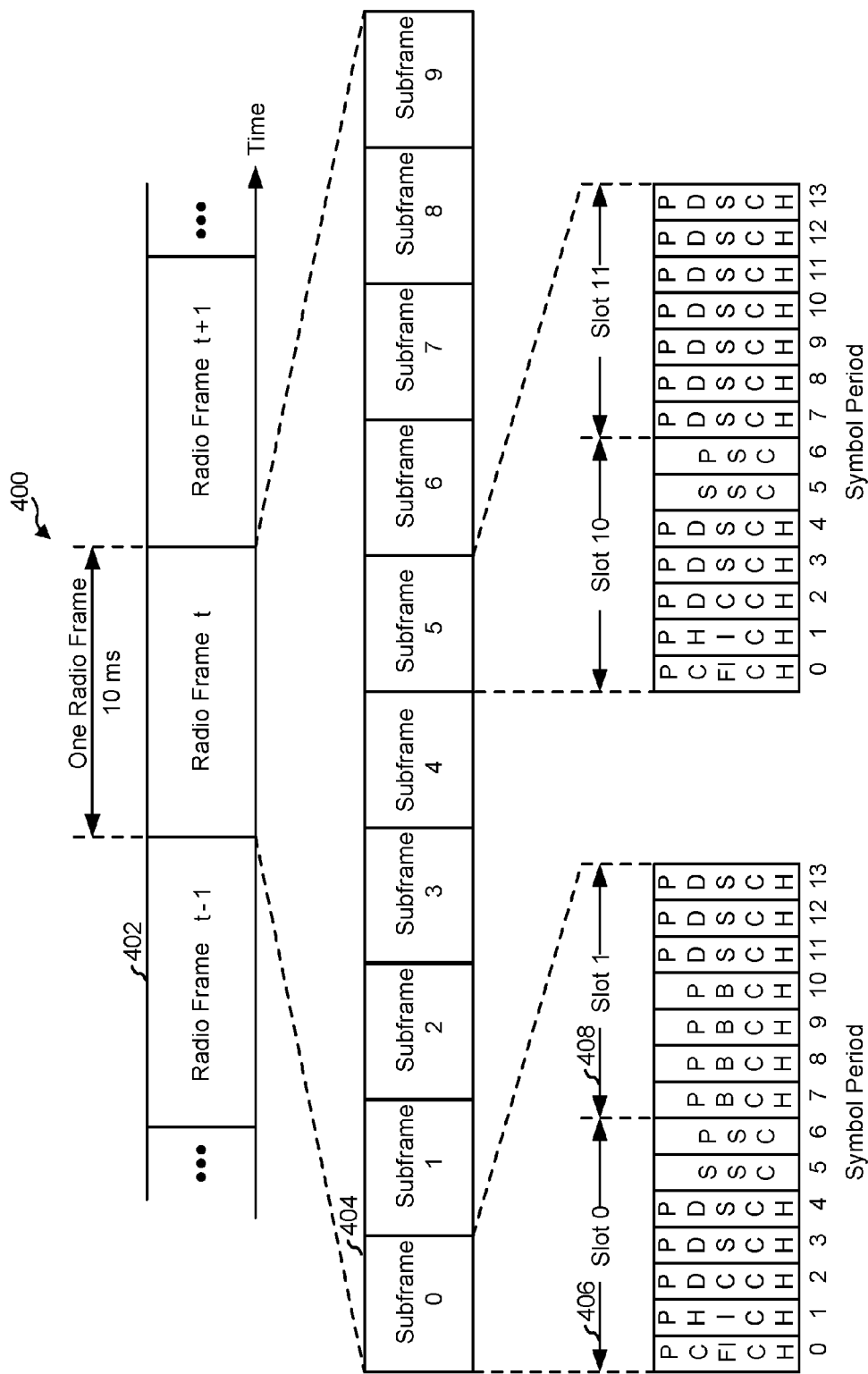
FIG. 4 is a block diagram conceptually illustrating an example of a downlink frame structure in a telecommunications system in accordance with an aspect of the present disclosure.
Figure 6:
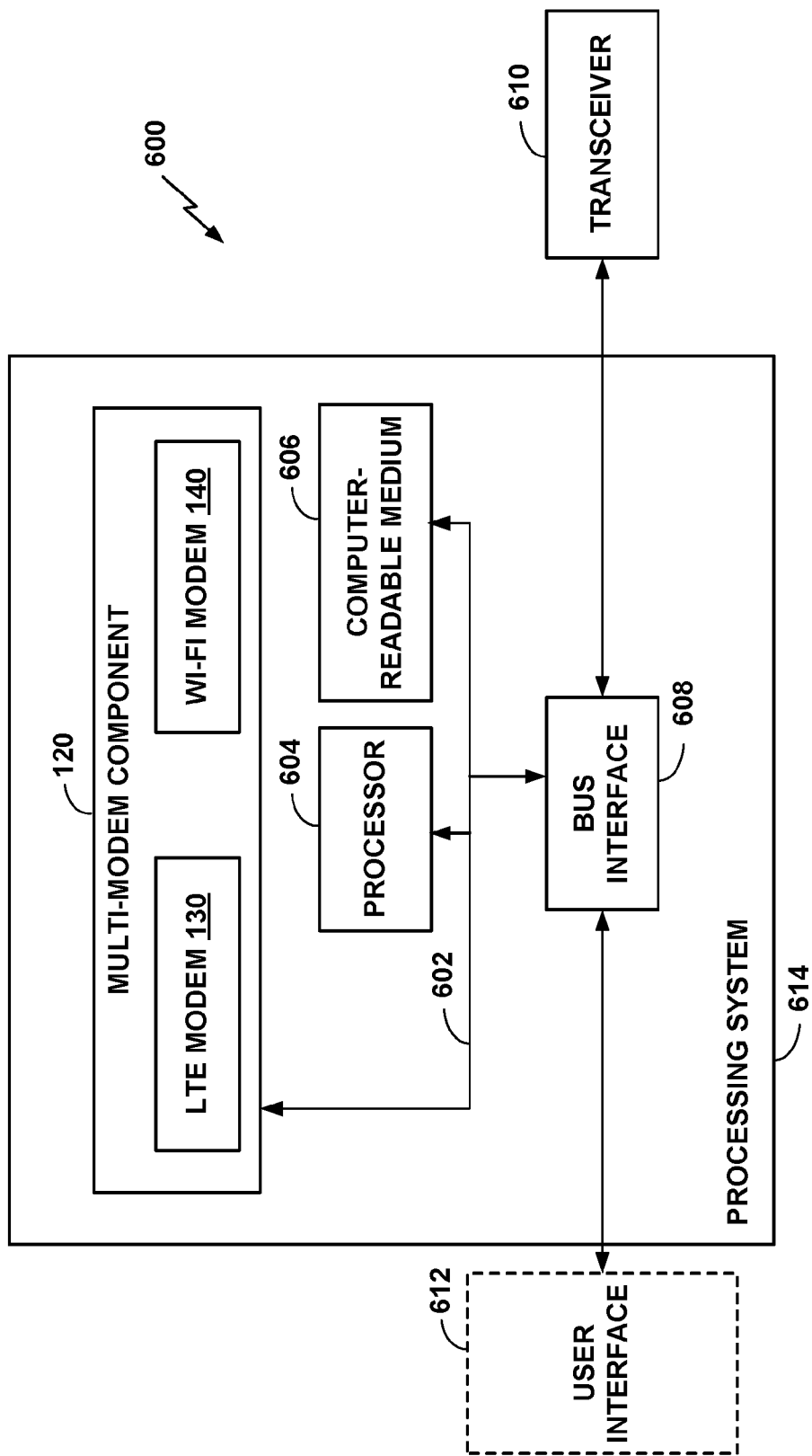
FIG. 6 is a block diagram illustrating an example of a hardware implementation for an apparatus employing a processing system.

FIG. 4 is a block diagram conceptually illustrating an example of a downlink frame structure in a telecommunications system in accordance with an aspect of the present disclosure. The transmission timeline for the downlink may be partitioned into units of radio frames 402. Each radio frame 402 may have a predetermined duration (e.g., 10 milliseconds (ms)) and may be partitioned into 10 sub-frames 404 with indices of 0 through 9. Each sub-frame 404 may include two slots 406 and 408. Each radio frame may thus include 20 slots with indices of 0 through 19. Each slot may include L symbol periods, e.g., 7 symbol periods for a normal cyclic prefix (as shown in FIG. 6) or 14 symbol periods for an extended cyclic prefix (not shown). The 2L symbol periods in each sub-frame 404 may be assigned indices of 0 through 2L−1. The available time frequency resources may be partitioned into resource blocks. Each resource block may cover N subcarriers (e.g., 12 subcarriers) in one slot.

As discussed above, an LTE receiver may use a frame structure to provide a channel estimate. For example, an LTE receiver may estimate an LTE channel based on allocated resource blocks. The LTE receiver may estimate a channel condition for each allocated resource block.

Figure 5:
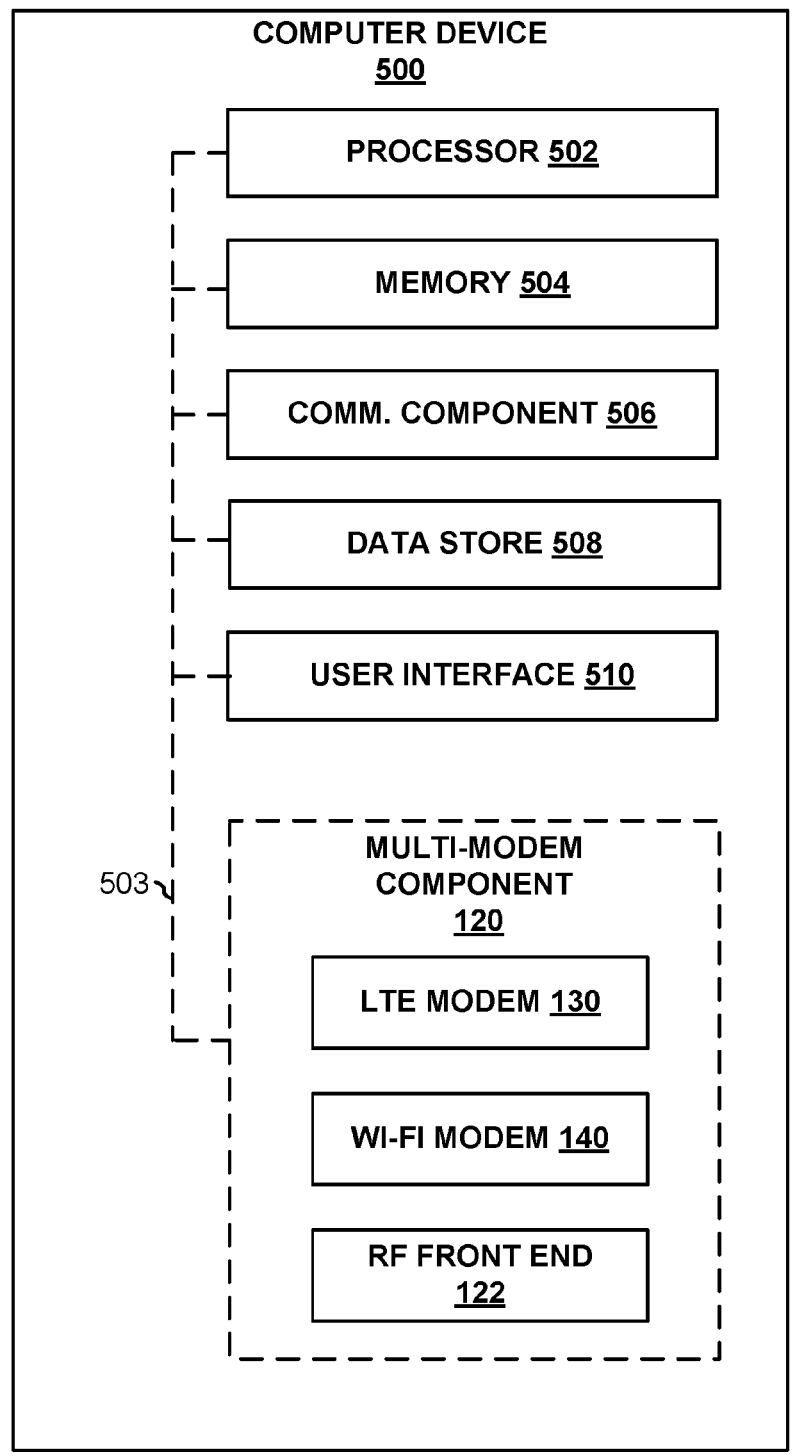
FIG. 5 is a block diagram illustrating aspects of a computer device according to the present disclosure.

Referring to FIG. 5, in one aspect, one or more of an access terminal 102 (FIG. 1A) or access point 106 (FIG. 1A), including multi-modem component 120 (FIG. 1A) can be represented by a specially-programmed or configured computer device 500. In one aspect of implementation, computer device 500 can include multi-modem component 120 (FIGS. 1A and 1B), such as in specially-programmed computer-readable instructions or code, firmware, hardware, or some combination thereof. For example, multi-modem component 120 may be implemented as one or more hardware modules or computer-executable code or instructions as part of one or more modems or transceivers of communications component 506, or as one or more specially-programmed hardware processor modules of a processor 502, or as computer-executable instructions or code stored as computer-readable media in memory a memory 504 or a data store 508, or some combination thereof. Moreover, multi-modem component 120 may be communicatively coupled by one or buses 503 to one or more of processor 502, memory 504, communications component 506, data store 508, and a user interface 510.

Processor 502 is configured for carrying out processing functions associated with one or more of components and functions described herein with respect to, at least, multi-modem component 120. Processor 502 can include a single or multiple set of processors or multi-core processors. Moreover, processor 502 can be implemented as an integrated processing system and/or a distributed processing system.

Memory 504, such as for storing data used herein and/or local versions of applications or instructions or code being executed by processor 502, such as in association with the operation of multi-modem component 120 as described herein. Memory 504 can include any type of memory usable by a computer, such as random-access memory (RAM), read-only memory (ROM), tapes, magnetic discs, optical discs, volatile memory, non-volatile memory, and any combination thereof.

Communications component 506 may be configured to provide for establishing and maintaining communications with one or more entities utilizing hardware, software, and services as described herein, in particular in association with the operation of multi-modem component 120 as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services.

Additionally, data store 508 can be any suitable combination of hardware and/or software, that provides for mass storage of information, databases, and programs employed in connection with aspects described herein. For example, data store 508 may be a data repository for applications not currently being executed by processor 502, such as for instructions and/or code and data associated with multi-modem component 120 as described herein.

User-interface component 510 is configured to receive inputs from a user of computer device 500 and/or is operable to generate outputs for presentation to the user. User-interface component 510 may include one or more input devices, including but not limited to: a keyboard, a number pad, a mouse, a touch-sensitive display, a navigation key, a function key, a microphone, a voice recognition component, any other mechanism capable of receiving an input from a user, or any combination thereof. Further, user-interface component 510 may include one or more output devices, including but not limited to: a display, a speaker, a haptic feedback mechanism, a printer, any other mechanism capable of presenting an output to a user, or any combination thereof.

FIG. 6 is a block diagram illustrating an example of a hardware implementation for an apparatus 600, for example, including the multi-modem component 120 (FIGS. 1A and 1B) and employing a processing system 614 for carrying out aspects of the present disclosure, such as method for optimizing coverage area of a small cell. In this example, the processing system 614 may be implemented with bus architecture, represented generally by a bus 602. Bus 602 can include any number of interconnecting buses and bridges, depending on the specific application of the processing system 614 and the overall design constraints. Bus 602 links together various circuits, including one or more processors, represented generally by processor 604, computer-readable media, represented generally by computer-readable medium 606, and one or more components described herein, such as, but not limited to, multi-modem component 120 (FIGS. 1A and 1B). Bus 602 can also link various other circuits, such as timing sources, peripherals, voltage regulators, and power management circuits, which are well known in the art, and therefore, will not be described any further.

A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

Processor 604 is responsible for managing bus 602 and general processing, including the execution of software stored on the computer-readable medium 607. The software, when executed by processor 604, causes processing system 614 to perform the various functions described infra for any particular apparatus. Computer-readable medium 607 can also be used for storing data that is manipulated by processor 604 when executing software. Multi-modem component 120, as described above, can be implemented in whole or in part by processor 604, or by computer-readable medium 606, or by any combination of processor 604 and computer-readable medium 606.

Figure 7:
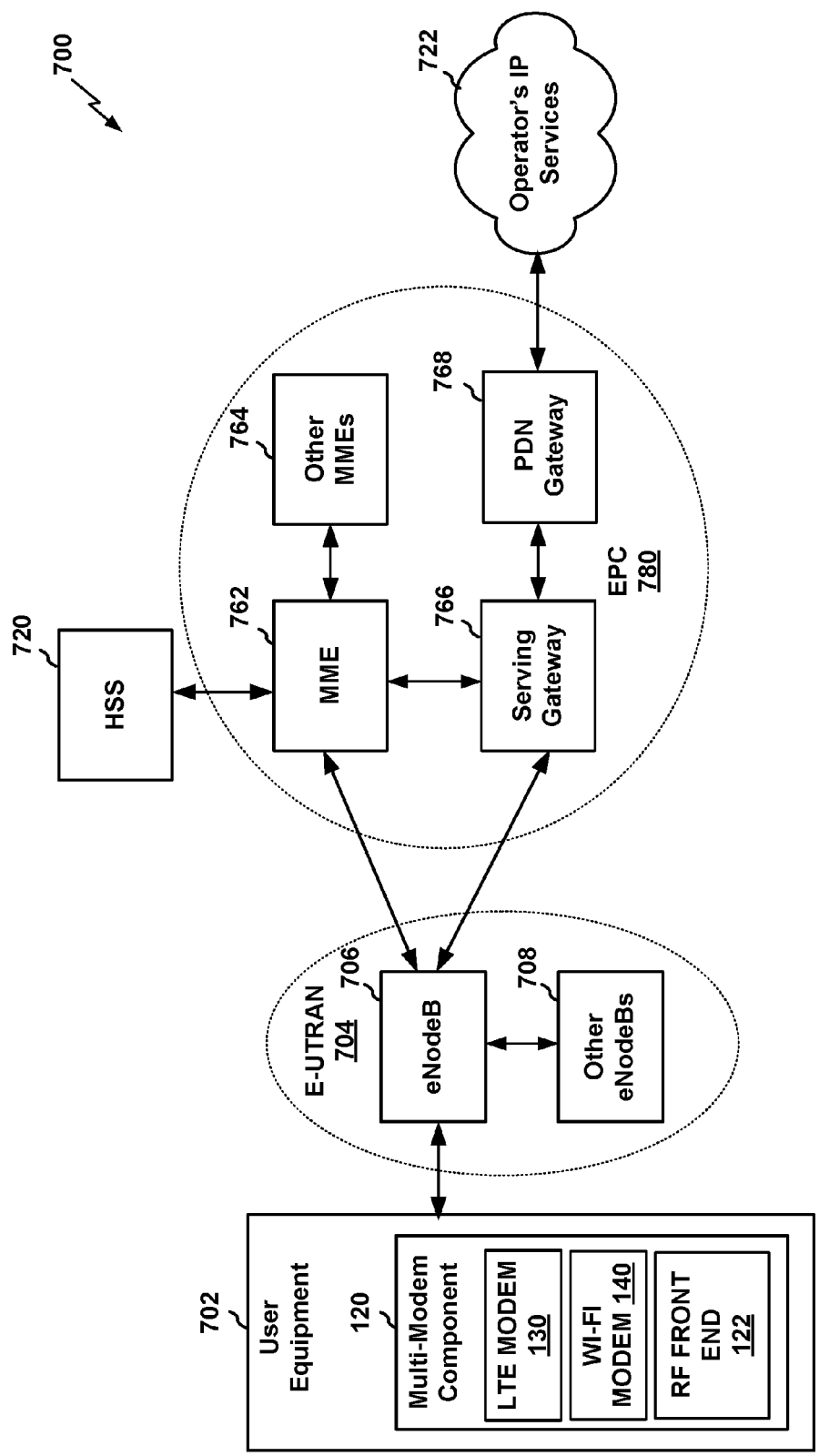
FIG. 7 is another block diagram conceptually illustrating an example of a telecommunications system.

FIG. 7 is a diagram illustrating a long term evolution (LTE) network architecture 700 employing various apparatuses of communications system 100 (FIG. 1A) and may include one or more access terminals 102 (FIG. 1A) or access points 106 (FIG. 1A). LTE network architecture 700 can operate in parallel to a network employing Wi-Fi (not shown). A network employing Wi-Fi may use a Wi-Fi protocol for a connection between an access terminal and an access point, but may use different architectures for a backhaul to an operator's network.

LTE network architecture 700 may be referred to as an Evolved Packet System (EPS) 700. EPS 700 may include one or more user equipment (UE) 702, an Evolved UMTS Terrestrial Radio Access Network (E-UTRAN) 704, an Evolved Packet Core (EPC) 780, a Home Subscriber Server (HSS) 720, and an Operator's IP Services 722. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes evolved Node B (eNB) 706 and other eNBs 708. The eNB 706 and 708 may each be an example of an access point 106 (FIG. 1A) including a dual-modem component for mitigating interference. The eNB 706 provides user and control plane protocol terminations toward the UE 702. The eNB 708 may be connected to the other eNBs 708 via an X2 interface (i.e., backhaul). The eNB 706 may also be referred to by those skilled in the art as a base station, a base transceiver station, a radio base station, a radio transceiver, a transceiver function, a basic service set (BSS), a small cell, an extended service set (ESS), or some other suitable terminology. The eNB 706 provides an access point to the EPC 780 for a UE 702. Examples of UEs 702 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 702 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 706 is connected by an S1 interface to the EPC 780. The EPC 780 includes a Mobility Management Entity (MME) 762, other MMEs 764, a Serving Gateway 766, and a Packet Data Network (PDN) Gateway 768. The MME 762 is the control node that processes the signaling between the UE 702 and the EPC 780. Generally, the MME 762 provides bearer and connection management. All user IP packets are transferred through the Serving Gateway 766, which itself is connected to the PDN Gateway 768. The PDN Gateway 768 provides UE IP address allocation as well as other functions. The PDN Gateway 768 is connected to the Operator's IP Services 722. The Operator's IP Services 722 includes the Internet, the Intranet, an IP Multimedia Subsystem (IMS), and a PS Streaming Service (PSS).

Figure 8:
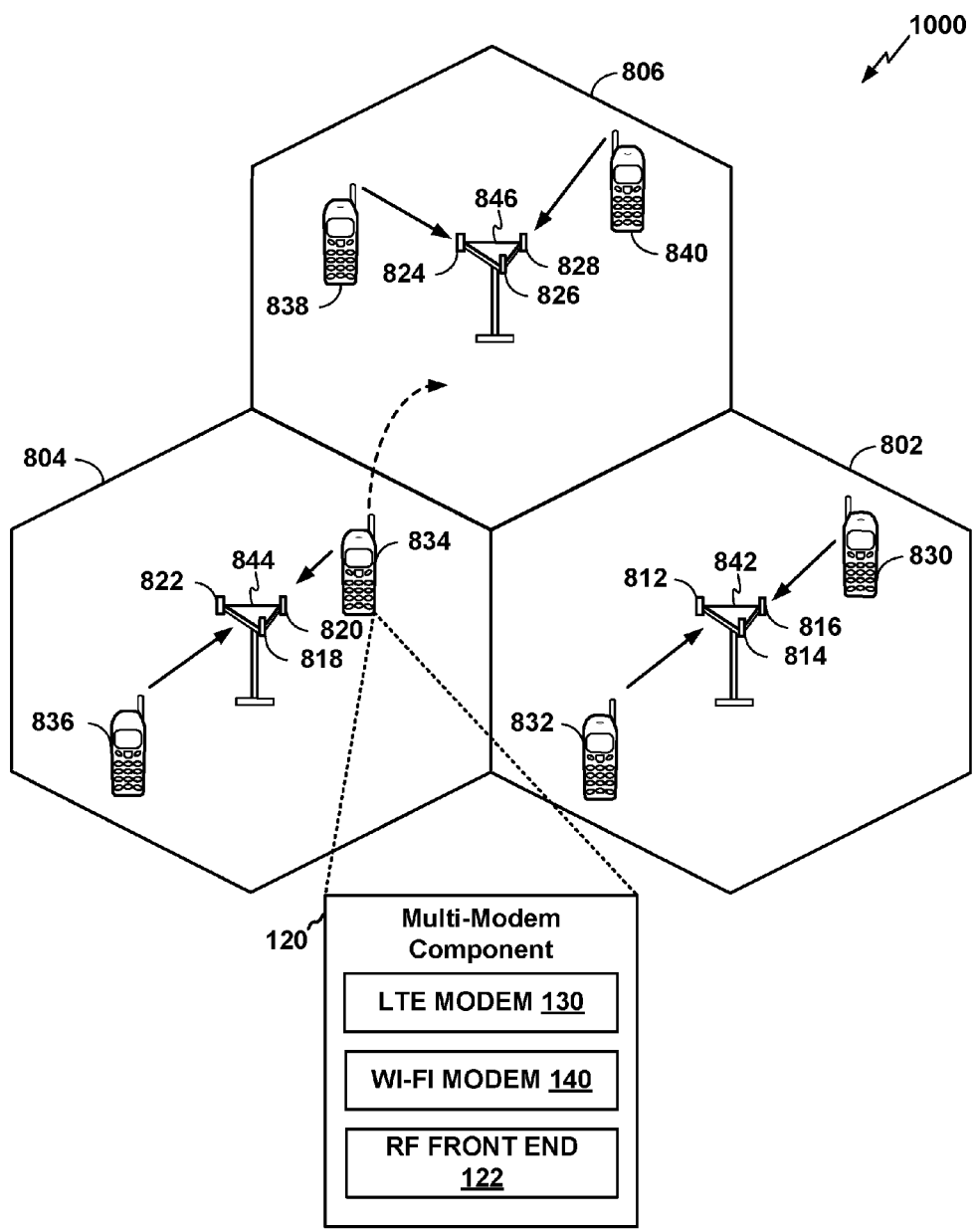
FIG. 8 is a conceptual diagram illustrating an example of an access network.

Referring to FIG. 8, an access network 800 in a UTRAN architecture is illustrated, and may include one or more access points 106 (FIG. 1A), which may be base stations or small cell nodes. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 819, 820, and 822 each correspond to a different sector. In cell 806, antenna groups 824, 826, and 828 each correspond to a different sector. The cells 802, 804 and 806 may include several wireless communication devices, e.g., UEs, for example, including access terminals 102 and 104 of FIG. 1A, which may be in communication with one or more sectors of each cell 802, 804 or 806. For example, UEs 830 and 832 may be in communication with NodeB 1042, UEs 834 and 836 may be in communication with NodeB 844, and UEs 838 and 840 can be in communication with NodeB 846. Here, each NodeB 842, 844, 846 is configured to provide an access point for all the UEs 830, 832, 834, 836, 838, 840 in the respective cells 802, 804, and 806. Additionally, each of UEs 830, 832, 834, 836, 838, 840 may be an example of access terminal 102 of FIG. 1A and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at EPC 780 (FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
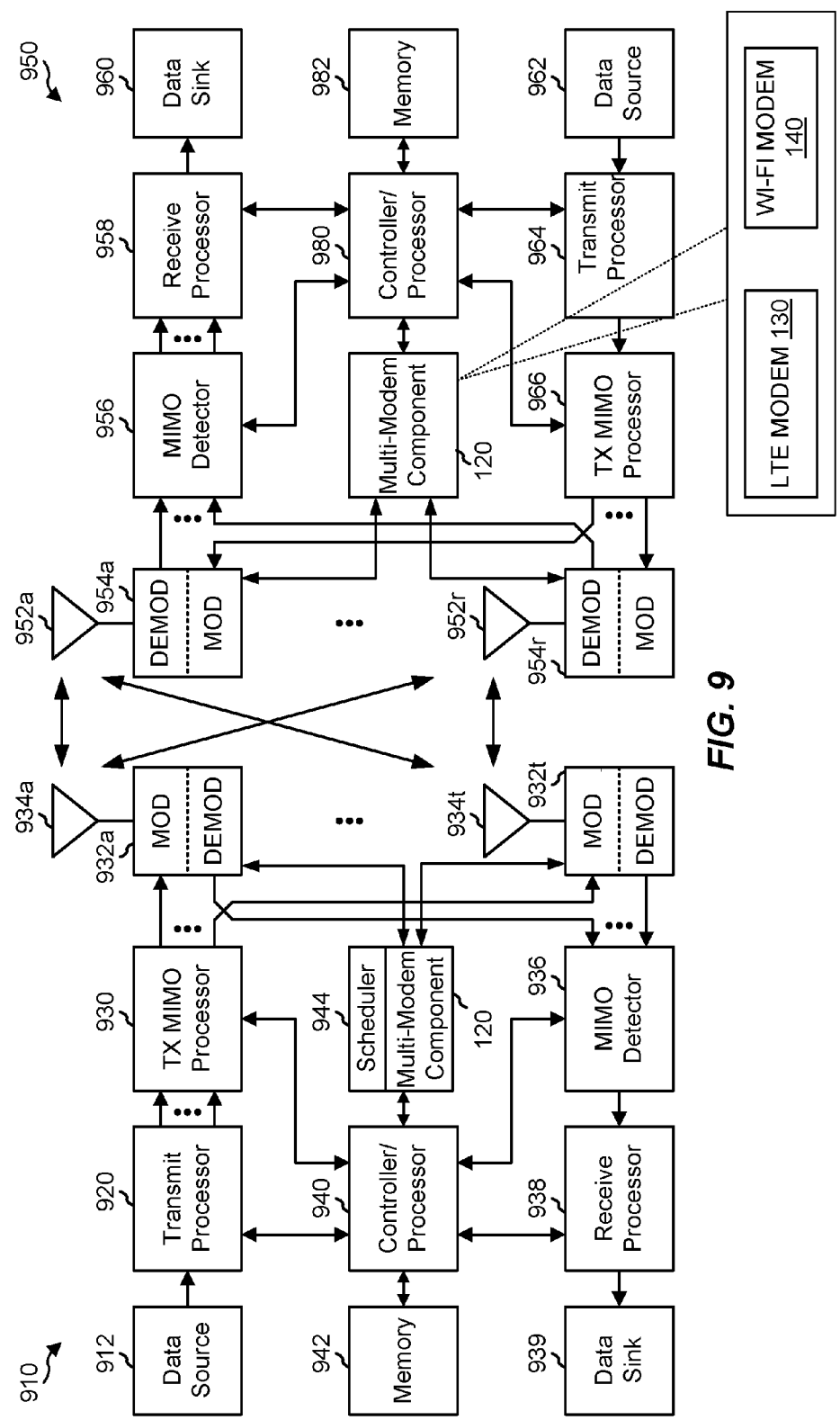
FIG. 9 is a block diagram conceptually illustrating an example of a NodeB in communication with a UE in a telecommunications system.

FIG. 9 is a block diagram conceptually illustrating an exemplary eNodeB 910 and an exemplary UE 950 configured in accordance with an aspect of the present disclosure. For example, the UE 950, as shown in FIG. 9, may be one of the access terminals 102, 104 having a multi-modem component 120. For example, the eNodeB 910, as shown in FIG. 9, may be one of the access points 106 having a multi-modem component 120. The eNodeB 910 may be equipped with antennas 934a-t, and UE 950 may be equipped with antennas 952a-r, wherein t and r are integers greater than or equal to one.

At the eNodeB 910, a base station transmit processor 920 may receive data from a base station data source 912 and control information from a base station controller/processor 940. The control information may be carried on the PBCH, PCFICH, PHICH, PDCCH, etc. The data may be carried on the PDSCH, etc. Base station transmit processor 920 may process (e.g., encode and symbol map) the data and control information to obtain data symbols and control symbols, respectively. Base station transmit processor 920 may also generate reference symbols, e.g., for the PSS, SSS, and cell-specific reference signal (RS). A base station transmit (TX) multiple-input multiple-output (MIMO) processor 930 may perform spatial processing (e.g., precoding) on the data symbols, the control symbols, and/or the reference symbols, if applicable, and may provide output symbol streams to the base station modulators/demodulators (MODs/DEMODs) 932a-t. Each base station modulator/demodulator 932 may process a respective output symbol stream (e.g., for OFDM, etc.) to obtain an output sample stream. Each base station modulator/demodulator 932 may further process (e.g., convert to analog, amplify, filter, and upconvert) the output sample stream to obtain a downlink signal. Downlink signals from modulators/demodulators 932a-t may be transmitted via the antennas 934a-t, respectively.

At UE 950, UE antennas 952a-r may receive the downlink signals from eNodeB 910 and may provide received signals to UE modulators/demodulators (MODs/DEMODs) 954a-r, respectively. Each UE modulator/demodulator 954 may condition (e.g., filter, amplify, downconvert, and digitize) a respective received signal to obtain input samples. Each UE modulator/demodulator 954 may further process the input samples (e.g., for OFDM, etc.) to obtain received symbols. A UE MIMO detector 956 may obtain received symbols from all the UE modulators/demodulators 954a-r, and perform MIMO detection on the received symbols if applicable, and provide detected symbols. A UE reception processor 958 may process (e.g., demodulate, deinterleave, and decode) the detected symbols, provide decoded data for UE 950 to a UE data sink 960, and provide decoded control information to a UE controller/processor 980.

On the uplink, at UE 950, a UE transmit processor 964 may receive and process data (e.g., for the PUSCH) from a UE data source 962 and control information (e.g., for the PUCCH) from UE controller/processor 980. UE transmit processor 964 may also generate reference symbols for a reference signal. The symbols from UE transmit processor 964 may be precoded by a UE TX MIMO processor 966 if applicable, further processed by UE modulator/demodulators 954a-r (e.g., for SC-FDM, etc.), and transmitted to eNodeB 910. At eNodeB 910, the uplink signals from UE 950 may be received by base station antennas 934, processed by base station modulators/demodulators 932, detected by a base station MIMO detector 936 if applicable, and further processed by a base station reception processor 938 to obtain decoded data and control information sent by UE 950. Base station reception processor 938 may provide the decoded data to a base station data sink 946 and the decoded control information to the base station controller/processor 940.

Base station controller/processor 940 and UE controller/processor 980 may direct the operation at eNodeB 910 and UE 950, respectively. Base station controller/processor 940 and/or other processors and modules at eNodeB 910 may perform or direct, e.g., the execution of various processes for the techniques described herein. UE controller/processor 980 and/or other processors and modules at UE 950 may also perform or direct, e.g., the execution of the functional blocks illustrated in FIGS. 2, 3, and 4 and/or other processes for the techniques described herein. Base station memory 942 and UE memory 982 may store data and program codes for eNodeB 910 and UE 950, respectively. A scheduler 944 may schedule UEs 950 for data transmission on the downlink and/or uplink. Multi-modem component 120 at eNodeB 910 may further include or be implemented by the modulators/demodulators 932, receive processor 938, controller/processor 940, memory 942, transmit processor 920, and/or modulators/demodulators 932. Multi-modem component 120 may further include similar components for a second RAT, such as Wi-Fi. In another aspect, UE 950 may also include a multi-modem component 120. Multi-modem component 120 at UE 950 may further include or be implemented by the modulators/demodulators 954, reception processor 958, controller/processor 986, transmit processor 964, and Tx MIMO processor 966. Multi-modem component 120 may further include similar components for a second RAT such as Wi-Fi.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
    receiving, by a first modem operating according to a first radio access technology (RAT), a message from at least one network entity operating according to the first RAT, wherein the received message is detected by the first modem at a measured energy level;
    receiving, by the first modem, a subsequent message from one of the at least one network entity or a distinct network entity different from the at least one network entity operating according to the first RAT;
    sending, from the first modem to a second modem operating according to a second RAT different from the first RAT, a detected energy level value based at least on the measured energy level of the received message, wherein the subsequent message is detected by the first modem at a subsequent measured energy level, and the detected energy level value is determined based on the measured energy level of the received message and the subsequent measured energy level of the subsequent message; and
    adjusting an energy detection threshold based on the detected energy level value received from the first modem.

2. The method of claim 1, further comprising determining, by the second modem, that the detected energy level value is below a default energy detection threshold, wherein adjusting the energy detection threshold includes adjusting based on determining that the detected energy level value received from the first modem is below the default energy detection threshold.

3. The method of claim 1, further comprising:
    determining, by the second modem, an interference level in a communication channel based on the adjusted energy detection threshold.

4. The method of claim 1, further comprising:
    adjusting, by one of the first modem or the second modem, the energy detection threshold based on the detected energy level value.

5. The method of claim 1, further comprising:
    determining, by the first modem, a minimum measured energy level among a plurality of measured energy levels including the measured energy level and the subsequent measured energy level; and
    setting, by the first modem, the determined minimum measured energy level as the detected energy level value.

6. The method of claim 1, wherein sending the detected energy level value includes sending, by the first modem to the second modem, header information associated with one or both of the received message or the subsequent message.

7. The method of claim 6, further comprising:
    filtering, by one of the first modem or the second modem, the measured energy level and the subsequent measured energy level; and
    determining, by one of the first modem or the second modem, the detected energy level value from the measured energy level associated with the received message and the subsequent measured energy level.

8. The method of claim 1, further comprising:
    waiting, by the first modem, for a defined period before the sending of the detected energy level value;
    receiving, by the first modem, a subsequent message from the at least one network entity or a different network entity operating according to the first RAT during the defined period, wherein the subsequent message is detected by the first modem at a second measured energy level;
    determining, by the first modem and in response to expiration of the defined period, the energy detection threshold based on the measured energy level of the received message and the second measured energy level of the received subsequent message; and
    wherein the sending of the detected energy level value comprises sending in response to expiration of the defined period.

9. The method of claim 1, wherein adjusting the energy detection threshold includes reducing the energy detection threshold based on the detected energy level value received from the first modem.

10. The method of claim 1, wherein adjusting the energy detection threshold includes adjusting as a function of the detected energy level value.

11. The method of claim 1, wherein the detected energy level value is a received signal strength indicator (RSSI) value of one or more decoded preambles over a defined time period.

12. The method of claim 1, wherein the first RAT operates according to a wireless local area network and the second RAT operates according to a wireless wide area network.

13. The method of claim 1, further comprising:
    transmitting a transmission message including:
    a first signature recognized by the at least one network entity operating according to the first RAT; and
    a second signature recognized by one or more network entities operating according to the second RAT.

14. An apparatus for wireless communication, comprising:
    a first modem configured to:
        operate according to a first radio access technology (RAT),
        receive a message from at least one network entity using the first RAT, wherein the received message is detected by the first modem at a measured energy level,
        receive a subsequent message from one of the at least one network entity or a distinct network entity different from the at least one network entity operating according to the first RAT, and
        send a detected energy level value based at least on the measured energy level of the received message, wherein the subsequent message is detected by the first modem at a subsequent measured energy level, and the detected energy level value is determined based on the measured energy level of the received message and the subsequent measured energy level of the subsequent message; and a second modem configured to:
operate according to a second RAT different from the first RAT, and
adjust an energy detection threshold based on the detected energy level value received from the first modem.

15. The apparatus of claim 14, wherein the second modem is further configured to determine that the detected energy level value is below a default energy detection threshold, and wherein the second modem is further configured to adjust the energy detection threshold based on determining that the detected energy level value received from the first modem is below the default energy detection threshold.

16. The apparatus of claim 14, wherein the second modem is further configured to determine an interference level in a communication channel based on the adjusted energy detection threshold.

17. The apparatus of claim 14, wherein one or both of the first modem or the second modem are configured to adjust the energy detection threshold based on the detected energy level value.

18. The apparatus of claim 14, wherein the first modem is further configured to:
determine a minimum measured energy level among a plurality of measured energy levels including the measured energy level and the subsequent measured energy level; and
set the determined minimum measured energy level as the detected energy level value.

19. The apparatus of claim 14, wherein to send the detected energy level value includes, the first modem is further configured to send header information associated with one or both of the received message or the subsequent message.

20. The apparatus of claim 19, wherein one of the first modem or the second modem is configured to:
filter the measured energy level and the subsequent measured energy level; and
determine the detected energy level value from the measured energy level associated with the received message and the subsequent measured energy level.

21. The apparatus of claim 14, wherein the first modem is further configured to:
wait for a defined period before sending the detected energy level value;
receive a subsequent message from the at least one network entity or a different network entity operating according to the first RAT during the defined period, wherein the subsequent message is detected by the first modem at a second measured energy level;
determine, in response to expiration of the defined period, the energy detection threshold based on the measured energy level of the received message and the second measured energy level of the received subsequent message; and
send the detected energy level value in response to expiration of the defined period.

22. The apparatus of claim 14, wherein to adjust the energy detection threshold, one of the first modem or the second modem is configured to reduce the energy detection threshold based on the detected energy level value received from the first modem.

23. The apparatus of claim 14, wherein to adjust the energy detection threshold, one of the first modem or the second modem is configured to adjust as a function of the detected energy level value.

24. The apparatus of claim 14, wherein the detected energy level value is a received signal strength indicator (RSSI) value of one or more decoded preambles over a defined time period.

25. The apparatus of claim 14, wherein the first RAT operates according to a wireless local area network and the second RAT operates according to a wireless wide area network.

26. The apparatus of claim 14, wherein one or both of the first modem or the second modem are configured to:
transmit a transmission message including:
a first signature recognized by the at least one network entity operating according to the first RAT; and
a second signature recognized by one or more network entities operating according to the second RAT.

27. An apparatus for wireless communications, the apparatus comprising:
means for receiving a message via a first radio access technology (RAT) from at least one network entity operating according to the first RAT, wherein the received message is detected at a measured energy level;
means for receiving, by the first modem, a subsequent message from one of the at least one network entity or a distinct network entity different from the at least one network entity operating according to the first RAT;
means for sending a detected energy level value based at least on the measured energy level of the received message via a second RAT different from the first RAT, wherein the subsequent message is detected by the first modem at a subsequent measured energy level, and the detected energy level value is determined based on the measured energy level of the received message and the subsequent measured energy level of the subsequent message; and
means for adjusting an energy detection threshold based on the detected energy level value.

28. A non-transitory computer-readable medium storing computer-executable code for wireless communications comprising:
code executable by a processor to receive, by a first modem operating according to a first radio access technology (RAT), a message from at least one network entity operating according to the first RAT, wherein the received message is detected by the first modem at a measured energy level;
code executable by a processor to receive, by the first modem, a subsequent message from one of the at least one network entity or a distinct network entity different from the at least one network entity operating according to the first RAT;
code executable by the processor to send, from the first modem to a second modem operating according to a second RAT different from the first RAT, a detected energy level value based at least on the measured energy level of the received message, wherein the subsequent message is detected by the first modem at a subsequent measured energy level, and the detected energy level value is determined based on the measured energy level of the received message and the subsequent measured energy level of the subsequent message; and code executable by the processor to adjust an energy detection threshold based on the detected energy level value received from the first modem.

* * * * *